United States Patent [19]

Liebermann

[11] 4,041,446
[45] Aug. 9, 1977

[54] CAPACITIVE-TYPE DISPLACEMENT AND PRESSURE SENSITIVE TRANSDUCER

[75] Inventor: Leonard N. Liebermann, La Jolla, Calif.

[73] Assignee: The United States of America as represented by the Secretary of the Navy, Washington, D.C.

[21] Appl. No.: 688,210

[22] Filed: May 20, 1976

[51] Int. Cl.² .............................................. G01V 1/16
[52] U.S. Cl. ............................ 340/17 R; 179/111 E; 340/8 R
[58] Field of Search ........................ 340/8 R, 15, 17; 179/111 E

[56] References Cited

U.S. PATENT DOCUMENTS

| 3,821,491 | 6/1974 | Whetstone et al. | 179/111 E |
| 3,851,183 | 11/1974 | Lewiner et al. | 179/111 E |
| 3,963,881 | 6/1976 | Fraim et al. | 179/111 E |
| 3,978,446 | 8/1976 | Miller | 179/111 E |
| 3,980,838 | 9/1976 | Yakushiji et al. | 179/111 E |

Primary Examiner—Maynard R. Wilbur
Assistant Examiner—T. M. Blum
Attorney, Agent, or Firm—Richard S. Sciascia; Paul N. Critchlow

[57] ABSTRACT

The transducer functions as a capacitor to sense variations in inter-plate distances produced either by transducer displacement or by pressure. The capacitor plates include flexible rubber sheathing members having interior conductive surfaces spaced slightly from a conductive centrally-disposed metal plate. A pair of electrets are disposed one between each rubber surface and the central metal plate. Electrets are a battery replacement supplying a large electrostatic field. Opposite polarization of the electrets provides push-pull and directional capabilities. Like polarities, or the omission of one electrode, provide responsiveness both to pressure and to displacement. The central metal plate has sufficient mass to remain substantially stationary relative to the flexible movements of the rubber sheathing. Variations in the plate spacings produces variations in the capacitor output.

4 Claims, 8 Drawing Figures

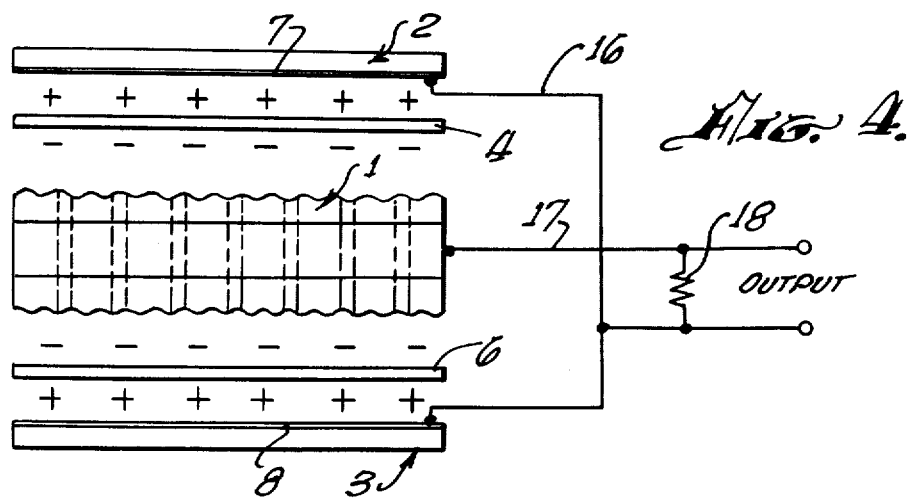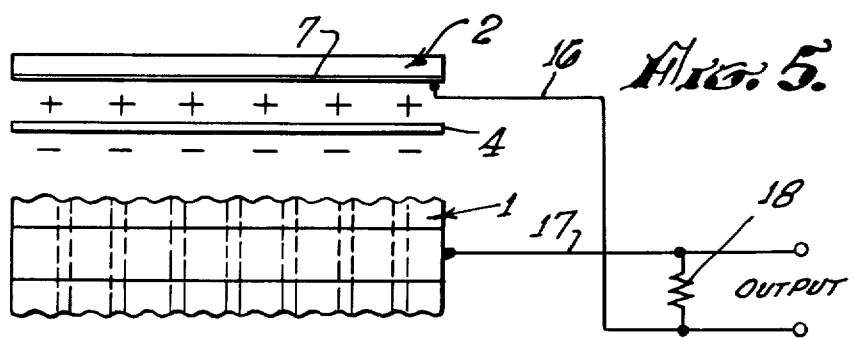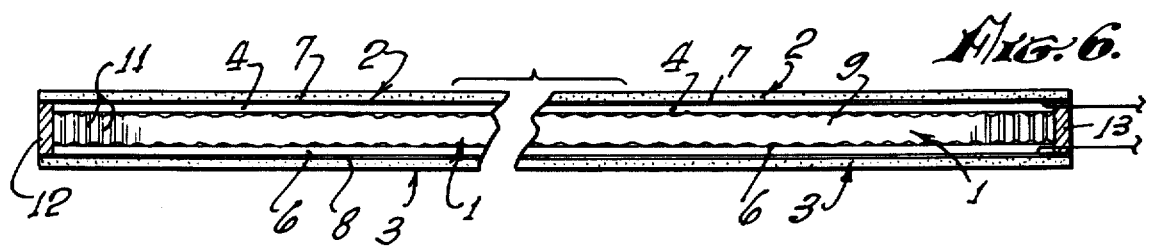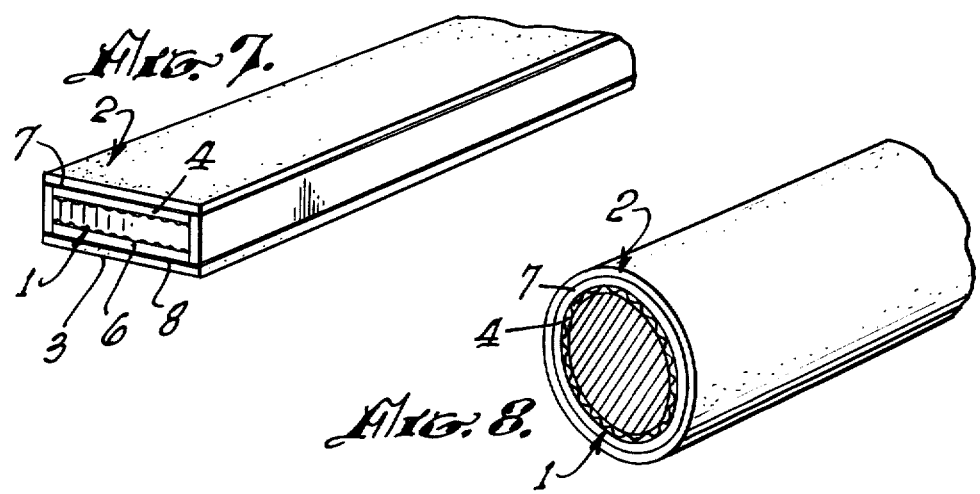

CAPACITIVE-TYPE DISPLACEMENT AND PRESSURE SENSITIVE TRANSDUCER

BACKGROUND OF THE INVENTION

The invention relates to electro-acoustic transducers and, in particular, to transducers selectively capable of responding either to transducer displacement or to pressure.

As will become apparent, the present transducer primarily is intended for use as an underwater reception sensor of hydrophone. However, its principle of operation as well as its general component arrangement readily adapts for other uses.

As is known, practically all underwater reception sensors have been of the type which respond to pressure variations as contrasted with transducer displacement and one reason for the pressure preference has been the relative ease of constructing pressure units such as those formed of the familiar piezo-electric materials. Displacement-type sensors, nevertheless, have high sensitivity and, as will be demonstrated, can be constructed economically and with relative ease. Consequently, they can be used advantageously in conjunction with or as substitutes for the widely-used piezo-electric pressure sensors.

It is also known that pressure sensors of the piezoelectric type or of any other type have certain limitations in their use as underwater sensors. In particular, their response to the so-called infrasonic frequencies may not be reliable because infrasonic wave lengths easily can exceed the water depths in which the pressure sensors are used. The infrasonce region generally includes frequencies of 30 Hz or below . Because of this limitation there are only a few limited observations available on shallow water ambient noise measurements at infrasonic frequencies. Displacement sensors are not subject to the same wave lengths limitations and thus are capable of providing valuable data.

A primary object of the present invention is to provide a sensitive, easily constructed means for sensing displacement as well as pressure-producing forces and, in particular, to provide an underwater reception sensor having these capabilities.

Another object is to provide a capacitive-type underwater reception sensor capable of utilizing electrets as a power source.

Another object is to provide a displacement sensor having a high sensitivity for selected frequency regions including the region of the infrasonic wave length.

Other objects and intended advantages will become more apparent in the ensuing description.

BRIEF DESCRIPTION OF THE DRAWINGS

The present invention is illustrated in the accompanying drawing of which:

FIGS. 4 and 5 are modified forms of the FIG. 3 arrangement;

FIG. 6 is another schematic illustrating an elongated arrangement suitable for infrasonic or other underwater use, and FIGS. 7 and 8 are sectional views illustrating two different forms of the FIG. 6 arrangement.

DETAILED DESCRIPTION OF THE INVENTION

Figure 3:
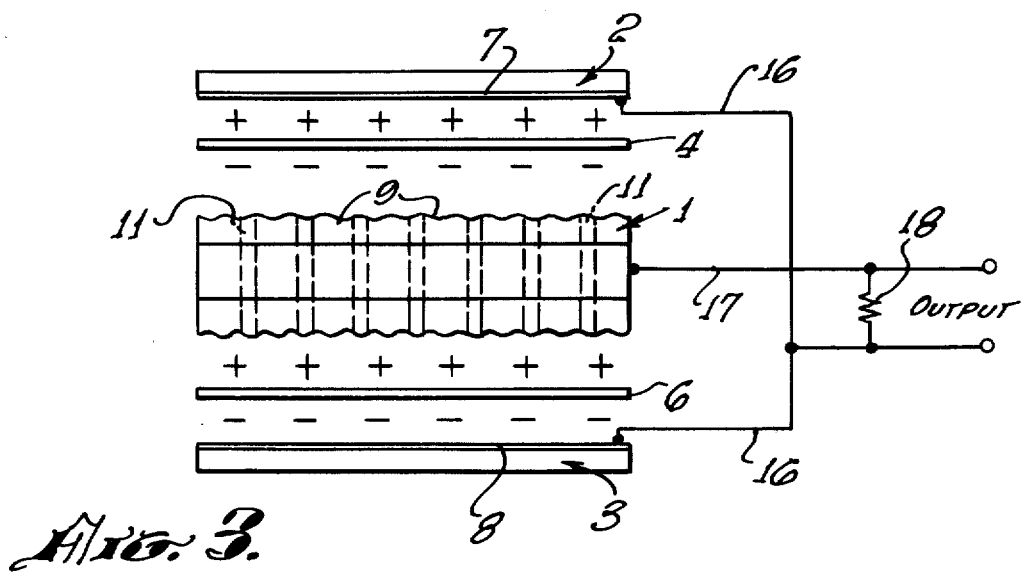
FIG. 3 is a somewhat schematic illustration of one form of the present transducer.

Referring first to FIG. 3, the present capacitive hydrophone includes several principal components which are a central, axially-disposed conductive metallic plate 1, a pair of upper and lower flexible, rubber-like sheets 2 and 3 and electrets 4 and 6. Electrets have the capability of supplying a large electrostatic field without current flow. Inasmuch as current flow in the transducer is negligible, such components can be used as suitable battery replacements. The electrets presently contemplated are commercially-available Teflon films which provide an effective voltage of 100–200 volts. As is known, electrets are commercially-available components which, in general, are permanently-polarized pieces or sheets of dielectric material constituting, in effect, the analog of a magnet. The procedure for forming the permanent charge on the electret also is known and described, for example by G. Sessler and J. E. West in "Journal of the Acoustical Society of America" Vol. 53, No. 6 pages 1589–1600, 1973. Other types of electrodes obviously can be substituted. As is shown in FIG. 3, electrodes 4 and 6 are oppositely polarized so that, in a manner that will become obvious, the transducer is capable of operating in a push-pull mode. The function of the electret sheets, of course, is to create the electrostatic field which results in potential difference between the capacitive plates of the present transducer, theses plates being provided by the surfaces of conductive metal plate 1 and by the inner surfaces of rubber sheets 2 and 3 which, as shown in FIG. 3, are formed each with an inner conductive surface designated in the drawing as surfaces 7 and 8. In practice, the conductive surfaces of the rubber sheets can be formed in the customary manner simply by painting the surface with a conducting paint. Alternatively, the rubber sheets themselves can be made of conducting rubber which also is available commercially. Centrally-disposed metal plate 1 preferably is an embossed aluminium plate which, as shown, is formed with a corrugated or an embossed surface having undulations designated by numeral 9 and intended to trap air. Also, plate 1, which is a solid plate, is provided with a series of closely-spaced apertures or openings 11 which permit trapped air to pass from one side of the plate to the other. Although not shown in FIG. 3, the entire arrangement is enclosed by suitable end fittings to provide a watertight unit which, as indicated, is air filled. The end fittings simply can be provided by end plates which, for example, are shown as end plates 12 and 13 in FIG. 6.

The FIG. 3 arrangement is intended to function primarily as a displacement sensor for underwater use or, in other words, as a displacement-sensitive hydrophone. In this regard, it is to be noted that displacement sensors basically must be inertial devices in which a mass, suspended by a spring, remains at rest with respect to the suspension point. Translated to the FIG. 3 arrangement, the inertial mass is provided by metal plate 1 which, for this purpose, has sufficient mass to remain stationary relative to the displacement movements of flexible rubber sheets 2 and 3. Although plate 1 is illustrated as being formed of embossed aluminium, if greater mass is desired, it can be made of a heavier material such as copper or the like. In operation, it is desirable that the metal plate remains essentially stationary and that only the conducting rubber be responsive to the displacement waves. In practice, although some slight movement of the metal plate may be experienced, the relative movement between the plate and the rubber sheets is sufficiently large to vary the capacitance and produce the desired results. As further may be noted in FIG. 3, the variations in the capacitance are provided as a transducer output by means of output circuitry including conductors 16 and 17 coupled respectively to inner conductive coatings 7 and 8 and to the outer surfaces of metal plate 1. For reasons to be explained, a resitor or an equivilant resistor component 18 is placed across the output conductors.

Figure 1:
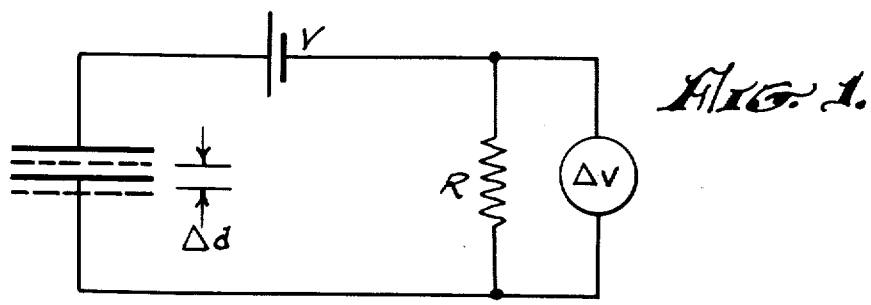
FIGS. 1 and 2 are circuit diagram illustrating the basic circuitry of the present capacitive-type transducer.

In displacement devices, such as FIG. 3 device, the displacement signal obviously results from a variation of capacitance which is accompanied by a proportional voltage change. The basic circuitry involved is shown in FIG. 1 which includes a voltage source or battery V, a capacitance C, and a resistor R. Displacements of the capacitor plates are indicated by the dotted lines and by the designation $\Delta d$, while the output signal is designated $\Delta V$. The term $\Delta C$ represents the change in capacitance due to the displacement movement of the capacitor plates. Considering such an arrangement, it can be assumed that one of the capacitor plates is subject to a small periodic motion. The capacitor change then is given by the equation $\Delta C = C_o \sin 2\pi$ ft. The resistance, R is deliberately selected to be sufficiently large so that the time constant, RC is much greater than $1/f$. Hence, the charge on the condensor can be considered constant during the plate motion. Thus, the condition that applies is $\Delta V = -V \Delta C/C$. Inasmuch as the capacitor change, $\Delta C$, is proportional to displacement, $\Delta d$, the transducer yields a voltage output proportional to displacement at frequencies for which the above conditions hold.

Figure 2:
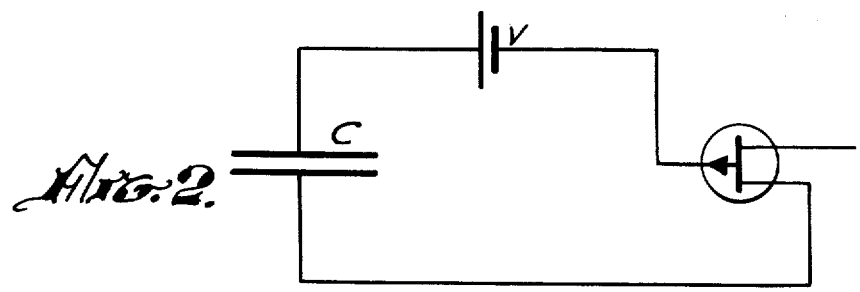

In actual practice, resistor, R, actually is unnecessary since it can be replaced by the gate resistance of a field effect transistor (FET) as shown in FIG. 2. Because the gate to source resistance of a FET is extremely large (approximately $10^9$ ohms), the effective R is large hence the time constant RC easily satisfies the condition that RC is much greater than $1/f$ for $f$ as low as 1 Hz. Thus, the present transducer easily can be designed for displacement reception at extremely low frequencies such as the infrasonic frequencies which are in a range below 30 Hz. If the present displacement transducer is to be adapted for other frequency ranges, comparable considerations can be applied to assure that the output voltage -66 -0 is proportional to the displacement $\Delta d$.

The sensitivity of typical displacement sensors such as the FIG. 3 sensor has been analyzed and it has been shown that the voltage output, $\Delta V$, is proportional to the ratio $\Delta C/C$. Inasmuch as $\Delta C/C$ is proportional to $\Delta d/d$, where d is the condensor spacing, the hydrophone sensitivity can be increased by decreasing $d$, although there is an ultimate minimum $d$ determined by the thickness of the electret. However, as the electrets thickness is reduced, it is accompanied by a reduction in its effective electrostatic field. Consequently, the sensitivity is only weakly dependent on the thickness of the electret. In the present implementation, a 3 mil Teflon electret is employed.

Because of transient peak motions, it usually is necessary to increase the dynamic range of the sensor by increasing $d$ at the expense of decreasing the sensitivity. Sensors used for test purposes, have been provided with a deliberately large spacing of 1 mm. With this spacing and with a plate diameter of 1.8 cm, the sensitivity was 5 volts per mm at 5 Hz. However, in operable devices used for undersea work, a precise spacing between the sandwiched components does not have to be closely observed and, instead, as will be pointed out, the various components can be disposed in a floating or loosely-contacting arrangement one with the other.

As has been noted, the FIG. 3 arrangement primarily is a displacement hydrophone operating with a push-pull response. This mode of operation is achieved because of the opposite polarities between electrets 4 and 6 which, as will be appreciated, doubles the response to displacement waves since one of the rubber surfaces will move toward the central plate while the other rubber surface is moving away from the plate. The output being a $\Delta V$, the so-called push-pull doubles the potential difference carried by the output conductors. Also, as will be appreciated, the opposite polarities arrangement provides a directionality determination of the displacement. Thus, the opposite polarity arrangement is one which primarily is adapted to provide sensitive measurements of displacement waves rather than a response to pressure components. As will be appreciated, the pressure components in the FIG. 3 arrangement are suppressed because such components cause each rubber plate to move toward the metal plate to minimize the $\Delta V$ output.

If it is desired to provide a sensor or transducer which is responsive to the pressure as well as displacement, the arrangements of FIGS. 4 or 5 may be utilized. As will be noted, FIG. 4 is precisely the same arrangement as that described with respect to FIG. 3 with the exception that the electrets 4 and 6 both have the same polarity. The FIG. 5 arrangement also is essentially similar to the FIG. 3 arrangement with the exception that one of the electrets has been omitted. Both the FIGS. 4 and 5 arrangements provide a response to pressure although they do not utilize the push-pull construction which is needed for directionality.

FIG. 6 illustrates an arrangement which lends itself to the production of sensors or transducers in continuous length for array applications and for the other uses. In general, FIG. 6 shows a transducer having the same sandwiched components as those previously described with respect to FIG. 3 and, although not shown, this transducer can also be one operating in the push-pull mode achieved by the opposite polarity of the electrets. There are two primary differences, however, between the FIG. 6 and the FIG. 3 forms. First, FIG. 6 is intended to represent an elongate transducer which, for example, has an end-to-end length substantially greater than the wave length of the displacement wave frequency which is to be measured. By way of illustration, it will be noted that a frequency of 5 Hz which is in the infrasonic region has a wave length of about 1,000 feet. If such a frequency is to be measured, the present transducer may have an overall length of several thousand feet. Such a length obviously presents difficulties in actual production. However, the present arrangement is one which readily adapts to extrusion techniques in that, as has been indicated, it is possible to achieve the desired sensitivity simply by disposing the sandwiched elements in a loose or floating contact on with the other rather than provide special mountings for each of the elements to achieve any precise spaced distance one from the other. Because such a floating contact is acceptable, the entire transducer can be fabricated in continuous length by well-known extrusion techniques. The cross-section of FIG. 7 shows the preferred flat sheet form of the transducer. However, the construction also can be cylindical as shown in FIG. 8 so as to resemble a garden hose with the metal electrode at the center. In cylindrical form the opposite polarity Teflon arrangement is not possible and the hydrophone will respond both to pressure and displacement. Also, as should be apparent, both the FIGS. 7 and 8 forms can utilize any desired polarity of the electrets or if desired, one of the electrets can be omitted in the manner shown in FIG. 5.

The operation of the present transducer has been described in some detail. However, it again should be noted that one significant aspect of the arrangement is that it permits a free flow of trapped air from one side of the metal plate to the other. It is this trapped air which provides the elastic component necessary for linear response. The trapped air, in turn, is caught in the undulations of the corrugated or embossed surfaces of the metal plate and, of course, it is passed from one side to the other through the numerous openings provided in the plate.

Obviously many modifications and variations of the present invention are possible in the light of the above teachings. It is therefore to be understood that within the scope of the appended claims the invention may be practiced otherwise as specifically described.

I claim:

1. An air-filled electro-acoustical transducer producing a voltage output proportionately responsive to displacement pressures of preselected acoustic wave frequencies, the transducer comprising:
   a plurality of elongate members of substantially equal length sandwiched in a loose contact one with the other whereby substantial transducer lengths can be extrudable formed, said transducer having a length greater than the wave length of a particular preselected frequency of interest,
   said plurality of sandwiched members including:
      an outer casing member providing an enclosure formed of elongate upper and lower flexible walls and end walls, said upper and lower walls having electrically-conductive inner surfaces and being displaceable responsively to said wave pressures acting only on their outer surfaces,
      a central electrically-conductive solid plate member disposed axially of said casing member flexible walls and having irregular upper and lower air-trapping surfaces and aperatures for permitting passage of said air transversely through said plate member, said plate member further having sufficient mass for remaining substantially stationary relative to said flexible wall displacements, and
      a sheet-like member formed of permanently-polarized dielectric material disposed co-extensively between said stationary plate-like member and each of said upper and lower flexible walls for establishing a voltage potential between said member and said walls, and
   voltage-output means coupled to the conductive surfaces of said plate member and said walls, said output means including a resistance member of sufficient value for assuring a voltage output proportional to the flexible wall displacements produced by said preselected frequency of interest.

2. The transducer of claim 1 wherein said permanently polarized dielectric sheet-like members are oppositely polarized for providing a directional push-pull displacement wave response.

3. The transducer of claim 1 wherein said resistance member is a field-effect transistor.

4. The transducer of claim 1 wherein said preselected acoustic wave frequencies are in the infra-sonic frequency range, and
   said plurality of elongate transducer members are in an extruded form having a length greater than the wave length of a preselected infra-sonic frequency of interest.

* * * * *